United States Patent [19]
Cave

[11] Patent Number: 5,859,641
[45] Date of Patent: Jan. 12, 1999

[54] AUTOMATIC BANDWIDTH ALLOCATION IN MULTIMEDIA SCRIPTING TOOLS

[75] Inventor: Ellis K. Cave, Garland, Tex.

[73] Assignee: InterVoice Limited Partnership, Reno, Nev.

[21] Appl. No.: 948,844

[22] Filed: Oct. 10, 1997

[51] Int. Cl.$^6$ ........................................ G06F 15/00
[52] U.S. Cl. .................... 345/348; 345/328; 345/302; 707/104
[58] Field of Search ........................ 345/328, 340, 345/348, 302, 349; 707/104

[56] References Cited

U.S. PATENT DOCUMENTS 5,307,456   4/1994   MacKay ................................. 345/328

*Primary Examiner*—Ba Huynh
*Attorney, Agent, or Firm*—Fulbright & Jaworski L.L.P.

[57] ABSTRACT

A tool for scheduling the delivery of media objects within varying constraints of available bandwidth. In a preferred embodiment in which the invention is enabled by software executable on a general purpose multimedia grade computer, a system designer orchestrates the playback of a series of media objects on a playback "score" analogous to a musical score. The system designer can also see the results of his or her work by playing back the playback score in real time on a corresponding runtime view. The media objects are represented on the playback score as playback icons. Responsive to the designer's manipulation of playback icons on the playback score, the present invention further creates and displays a corresponding download score, also viewable by the system designer, in which download icons (corresponding to playback icons on the playback score) are automatically deployed and arranged to fill up a displayed "pipe" of available bandwidth. The topographical area of the download icons, as displayed, corresponds to the data size of the media objects. The download icons are displayed as rectangular or square-cornered polygonal shapes. As the playback score becomes more information-rich, the pipe tends to fill to capacity with download icons. Eventually, as more information is added, delivery tends towards an error condition where download can no longer keep up with demand (i.e. the pipe is full). When this happens, the invention highlights this condition to the designer. The designer must then take action to correct the error condition so that delivery of media objects is once again compatible with playback. Alternatively, in a second embodiment, the system automatically degrades the content of media objects according to preselected sequences and conditions. The corresponding reduction in data-richness of degraded media objects causes the delivery thereof to again be compatible with playback.

60 Claims, 4 Drawing Sheets

AUTOMATIC BANDWIDTH ALLOCATION IN MULTIMEDIA SCRIPTING TOOLS

RELATED APPLICATIONS

This application is related to the following two commonly-assigned and co-pending U.S. patent applications: (1) USER DEVICE-INDEPENDENT TRANSACTION MODEL, filed Dec. 5, 1996, Ser. No. 08/761,004; and (2) VISUAL AID FOR BANDWIDTH ALLOCATION IN MULTIMEDIA SCRIPTING TOOLS, filed concurrently herewith, Ser. No. 08/949,062. The disclosures of these applications are incorporated herein by reference.

TECHNICAL FIELD OF THE INVENTION

This invention relates generally to the delivery of electronic multimedia information, and more specifically to a graphical tool that automatically allocates bandwidth in scripting the delivery of media objects prior to playback thereof.

BACKGROUND OF THE INVENTION

The above-referenced, commonly assigned and co-pending U.S. application entitled USER DEVICE-INDEPENDENT TRANSACTION MODEL (the "UDT Invention") discloses a model for delivering generic information from a central system to connected users whose terminal devices communicate in varying formats and/or media. The UDT Invention teaches the use of Transaction Templates (TTs) and User Device Templates (UDTs) which script and condition device-independent information exchanges between the system and users to be compatible with the different format and media requirements of said users' various terminal devices. In the UDT Invention, TTs enable an exchange of information between the system and the user in the information's most basic, generic format. UDTs associated with each TT then condition the information exchanged in the TT to be format- and media-compatible with the device through which the user is communicating with the system. The same information exchange may thus be enabled in a variety of environments according to the formats and media supported by various users' terminal devices.

A constraint placed upon the effectiveness of UDTs, however, is the available bandwidth in which to deliver information in the scripted formats and/or media. This is particularly applicable when the information is to be delivered in several media, the display of which to the user is to appear simultaneous and/or synchronized. It will be appreciated that, according to the UDT Invention, a UDT may be designed wherein an information transaction is scripted to appear to the user as a sophisticated multimedia experience, including sound, video, graphics and text, assuming that all of these media are supported by the user's multimedia PC. If the available bandwidth in the interconnecting link between system and user is insufficient to deliver all this information according to the time constraints of the script, however, this multimedia UDT will operate at reduced effectiveness.

One solution to this problem of insufficient bandwidth is for the user simply to sit and wait for a sufficient amount of information to have been delivered to begin the script with confidence that it can be completed without running out of information mid-script.

Another solution is to redesign either (or both) the sequence or the content of the script, so that the script's delivery is either slower or less data-rich. For example, a display of merely ornamental graphics could be delayed or removed to make room for the earlier delivery of more strategic information. Alternatively, a media object may be degraded (e.g. sampling rate reduced) to make the object less data-rich.

A yet further solution is to preload information in advance of its being needed by the script. This solution may be enabled using excess bandwidth in early parts of a particular script. This may be done on an individual script basis, alternatively, when the system knows specifically that a later script will be played, information for that later script may be preloaded on the user's terminal device using excess bandwidth during an earlier script.

Whichever solution is chosen, however, it would be highly advantageous to have a computer tool that enables delivery of information to be scheduled so as to optimize available bandwidth, while still enabling the playing of a multimedia script with minimal startup delay and no interruptions. Using this tool, the system designer would be able to orchestrate scripts linked to an optimum delivery schedule of the underlying media objects. When insufficient bandwidth is available for an instantaneous playback, the designer would further be able to make choices among the alternatives described above, such as delaying startup, redesigning script sequence and/or content, or preloading information, so as to make full and best use of available bandwidth. Further, in the context of UDTs according to the UDT Invention, the designer would be able to design an array of UDTs in which a particular information exchange could be scripted to be delivered at various levels of multimedia sophistication according to predetermined increments of available bandwidth.

Methods of identifying and quantifying available bandwidth in interconnecting links are known in the art. It will therefore be seen that given an array of UDTs as described above, each designed to deliver media objects on a schedule that fits within the constraints of an incrementally different bandwidth, it would then become possible, under the UDT Invention, to select a UDT to match the available bandwidth recognized in a particular interconnecting link.

Orchestrating the delivery of media objects within available bandwidth would further be advantageously enabled in a graphical environment on a general purpose multimedia-grade desktop computer. For example, scripting tools are known in the art where a designer may orchestrate the playback of a series of media objects by creating, adapting and executing a horizontal bar chart, much like a "musical score." There is a need in the art to attach this known orchestration and playback capability to corresponding functionality that shows how playback choices are affected by the constraints of delivery bandwidth. In this way, a designer may design, see, hear and manipulate scripts that also take delivery variables such as available bandwidth into account.

The disclosure of above-referenced U.S. application VISUAL AID FOR BANDWIDTH ALLOCATION IN MULTIMEDIA SCRIPTING TOOLS (the "Manual Invention") describes an invention in which the system displays a "download score," viewable in combination with orchestration and playback functionality. The download score enables a system designer to develop manually a "download script" of media objects that delivers information within a fixed bandwidth constraint (or "pipe") to meet the demand for data in the playback functionality. According to the Manual Invention, the system designer may adapt the shape of "download icons" on the download score so as to fit within the pipe. When all the download icons fit within the pipe without creating an error condition, the system designer knows that the media objects that he or she has selected and scripted on the playback score are deliverable within the bandwidth constraint that he or she selected on the download score. As disclosed in the Manual Invention, however, the designer may have adjust the playback script several times by "trial and error" in order to create a playback score that is deliverable through the pipe. It would be highly advantageous to be able to automate selected aspects of the creation of the download script according to predefined "delivery rules," where the system automatically deploys download icons within the pipe according to the delivery rules and then adjusts their shape to fill up available bandwidth. In this way, the system designer could focus on developing aesthetically pleasing playback scripts deliverable within constraints of bandwidth without having to spend time manually adapting the shape of media objects to fit within a pipe on a display.

SUMMARY OF THE INVENTION

For the purposes of this disclosure, "media object" or "object" is defined as an information structure, such as a file, which, when executed on a computer, plays the information to a user. A media object may be, for example, a sound clip, or a video clip, or a graphic. Media objects may come in any size or format suitable to be intelligible to a user through a variety of terminal devices.

In distinction to the foregoing definition of a media object, this disclosure also defines a "media icon" or "icon" as a representation of a media object on a terminal device, usually a computer screen.

Similar to the Manual Invention, the present invention is directed to a graphical representation of media object delivery in a limited bandwidth wherein the delivery of these objects may be optimized to make the best use of the available bandwidth. In a preferred embodiment, the invention presents three screens, or "views" to the system designer.

The designer advantageously first orchestrates a multimedia presentation by deploying media objects as a script on a "playback" score. The playback score allows the system designer to select and schedule media objects to be played back in overlapping sequence so as to make a predefined presentation. The playback score shows the media objects represented as playback icons relatively deployed on a time-indexed schedule, much like a musical score shows notes represented as recognizable marks on a stave. The designer further inputs additional parameters regarding the scripted media objects themselves. These additional parameters include media object size (when file size is not already known by the computer system), sequencing requirements with other objects, synchronicity requirements with other objects, and so on. Other media object parameters, such as time to start and time to stop, may also be recorded by the system from the designer's placement of the playback icons on the playback score.

A second screen, or "view" corresponding to the playback score is the runtime view. Advantageously viewable concurrently with the playback score by arranging multiple windows on the screen, the runtime view allows the system designer to see the executed presentation of the playback score in real time. In the runtime view, the system defaults to playing back the playback score at the same speed that the presentation is orchestrated on the playback score, from a start point to an end point in time as marked by the designer on the playback score. The designer may also speed up or slow down the runtime view's execution as required to observe particular details. It will be understood, however, that the runtime view is a "slave screen" as far as orchestration of the playback score itself is concerned. That is, the designer uses the playback score as the tool to ordain the selection and substantive scheduling of media objects in making a presentation. The runtime view merely allows the designer to see the results of his or her work.

As the playback score and the corresponding runtime view are being developed, the present invention also develops a download score. This screen, or "view," is a third view corresponding to the playback score, again also viewable by switching computer screens or manipulating multiple windows. In the present invention, the download score is a tool for the system designer to see the script embodied by the playback score (the "Playback Script") arranged by the system into a corresponding delivery schedule within predefined constraints of bandwidth (the "Download Script"). The system designer may thus create a Playback Script with a view to enabling the script to be played back intelligibly over a connection of limited bandwidth.

The system automatically deploys and arranges download icons on the download score, each download icon corresponding to a playback icon on the playback score. The download score also displays a constraint of bandwidth previously ordained by the system designer, this constraint advantageously displayed as a separation of parallel lines, referred to herein as a "pipe". The system automatically arranges download icons within the pipe according to predefined "delivery rules", such as (1) not exceeding available bandwidth (i.e. not straying outside the pipe), (2) using up all available bandwidth within the pipe, and (3) ensuring that delivery of a particular media object on the Download Script keeps up with demand for it on the Playback Script.

As noted in a preferred embodiment, the present invention is enabled on software executable by a general purpose desktop computer. The computer is advantageously a multimedia-grade computer with capability to display alternately or concurrently the playback score, the runtime view and the download score, and further to play both visual and aural media objects in the runtime view according to the Playback Script. The software ideally runs under a well-known user-friendly operating system environment such as MicroSoft® Windows.

As will be described in further detail below, in a preferred embodiment the system designer sees media objects as icons deployed on the playback score in an environment similar to other scripting tools known in the art. On the corresponding download score, however, the system designer sees media objects as icons distributed graphically within the "pipe" of available bandwidth. The width of the pipe, of course, may be varied, scaled to represent corresponding variation in available bandwidth. The length of the pipe is indexed to represent time. The topographical size of an icon, when deployed in the pipe, thus represents the corresponding media object's data size. The interrelated shapes and relative location of the icons as deployed within the "pipe" thereby represent a delivery schedule of corresponding media objects within available bandwidth. As a result, the designer may develop Playback Scripts of media objects that are compatible with known constraints of bandwidth. If the designer takes an action on the playback score that causes a delivery rule error (e.g. pipe boundaries exceeded, delivery cannot keep up with demand), then the invention alerts the designer with an alarm. Advantageously, the computer highlights the icon(s) out of compliance with the rule on both playback and download scores. Different highlights may indicate different problems. The designer must then make adjustments (e.g. increase bandwidth, change media object content, move media objects, drop or substitute media objects) to compensate.

In a second embodiment, the system automatically degrades the content of media objects (by, for example, resampling) according to preselected sequences and conditions ordained by the user. The corresponding reduction in data-richness of degraded media objects causes the Download Script to again be compatible with the Playback Script.

A primary application for the invention is thus the design of UDTs, so that bandwidth constraints may be taken into account when scripting media objects to be delivered to a user to enable an information transaction. The present invention is nonetheless not limited to this UDT application, and may be used whenever media object delivery needs to be optimability.

In UDT applications, it will be seen that an array of UDTs may be designed for each information transaction, accommodating media object delivery not only in formats supported by the user's terminal device, but also on a schedule supportable by the bandwidth of the interconnecting link. Advantageously, different UDTs support different ranges of bandwidth in which media objects are deliverable to support correspondingly information-rich scripts.

It is therefore a technical advantage of the present invention to optimize available bandwidth in delivering media objects.

It is a further technical advantage of the present invention to facilitate creation of an array of media object Download Scripts, each generally directed to delivering information in formats and/or media compatible with a particular receiving terminal device, each further specifically delivering selected media objects on a schedule deliverable within incremental ranges of available bandwidth.

It is a further object of the present invention to provide a designer with an interactive graphical tool with a playback score to design and adjust media object Playback Scripts within various bandwidth limitations. By also providing a companion download score on which the system automatically arranges download icons to fit within a fixed pipe of bandwidth, the tool enables the designer to schedule the delivery of the media objects to meet the demand for data in the Playback Script.

It is a still further object of the present invention to allocate bandwidth automatically, so that the system designer can spend more time concentrating on aesthetic aspects of the multimedia presentation design. The automated aspect of the invention allows the designer to make variations to the Playback Script based on aesthetic considerations, and then see/hear the results in the runtime view. Meanwhile, the invention automatically allocates and reallocates bandwidth in the Download Script responsive to the designer's changes to the Playback Script, and then alerts the designer if such changes have caused the Download Script now to violate one or more of the predefined delivery rules. The designer thus spends very little (if any) time adapting download icons on the download score to develop a Download Script (the system now doing this automatically), and the designer may instead spend more time developing aesthetically pleasing multimedia presentations using the Playback Script.

It is a still further object of the present invention to optionally enable automatic degradation of media objects according to designer-selectable criteria in compiling a Download Script that is compatible with the Playback Script.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
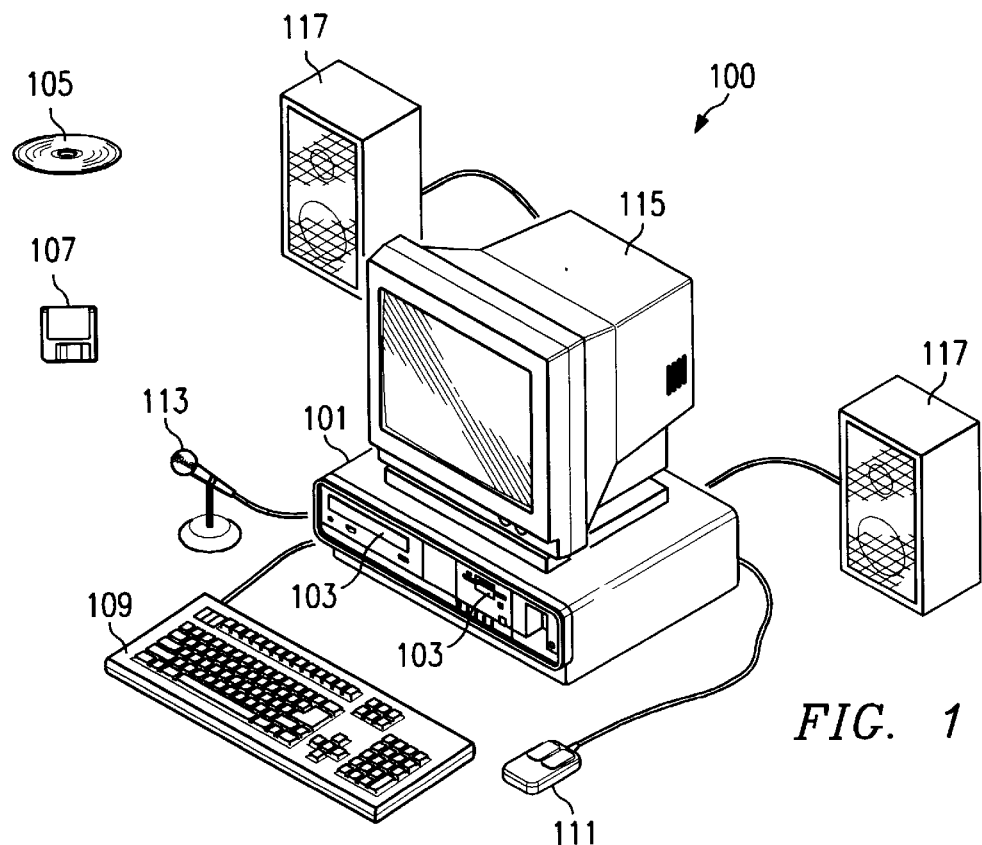
FIG. 1 illustrates an exemplary computer system on which a preferred embodiment of the present invention may advantageously be run.

A preferred embodiment of the present invention is enabled on a general purpose desktop computer, advantageously "multimedia" grade, as illustrated on FIG. 1. Referring to FIG. 1, system 100 comprises CPU 101, having an internal processor, memory, and a mass storage device such as a hard drive (these internal components not illustrated). CPU 101 also advantageously includes drives 103 to read and write to external mass storage devices such as CD 105 or diskette 107. User input is enabled via standard peripheral devices such as keyboard 109, mouse 111 and microphone 113. System output is enabled visually on monitor 115, and audibly on speakers 117.

In a preferred embodiment, the present invention is a software tool executable on system 100, although it will be understood that the principles and scope of the present invention are not limited to any particular specific hardware architecture or configuration. The present invention may be stored on any suitable mass storage device as a computer program product comprising instructions and logic readable and executable by system 100. Such suitable mass storage devices include CD 105, diskette 107, or hard drive within CPU 101 (not illustrated). Likewise, data to be processed by the present invention, including media objects and selected instructions from the user, may be stored on system 100 as computer-readable files on mass storage devices such as CD 105, diskette 107, or hard drive within CPU 101 (not illustrated).

Figure 2A:
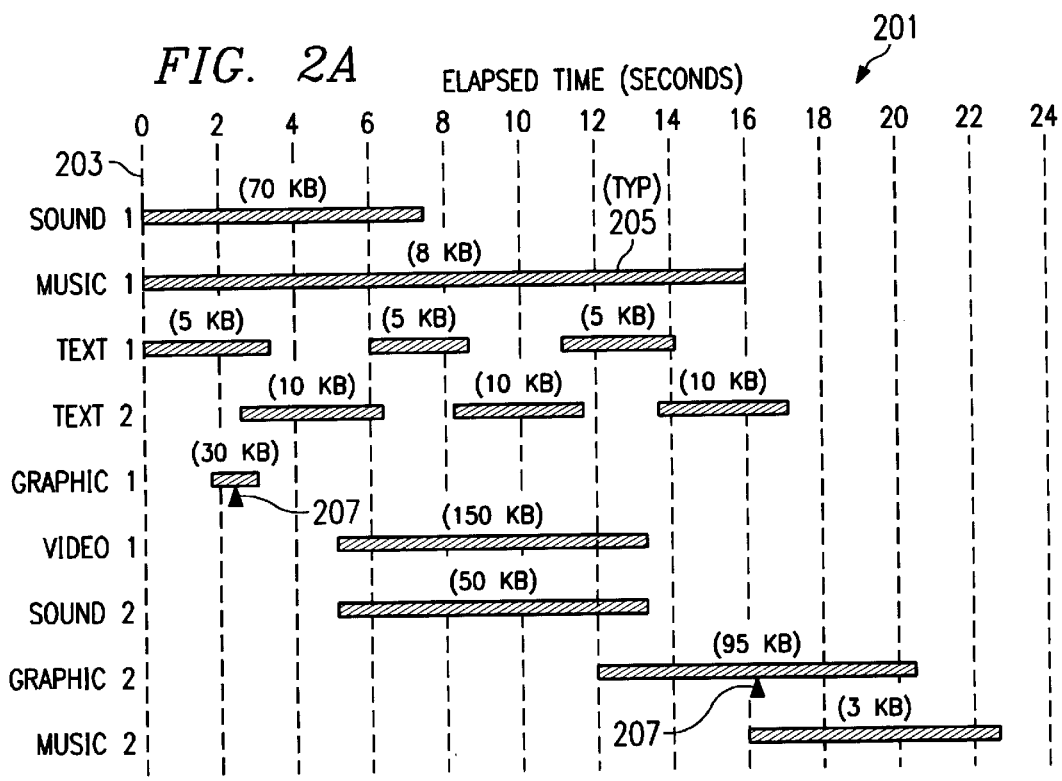
FIG. 2A illustrates an exemplary playback score 201 as used according to the present invention to orchestrate the playback of media objects.
Figure 2B:
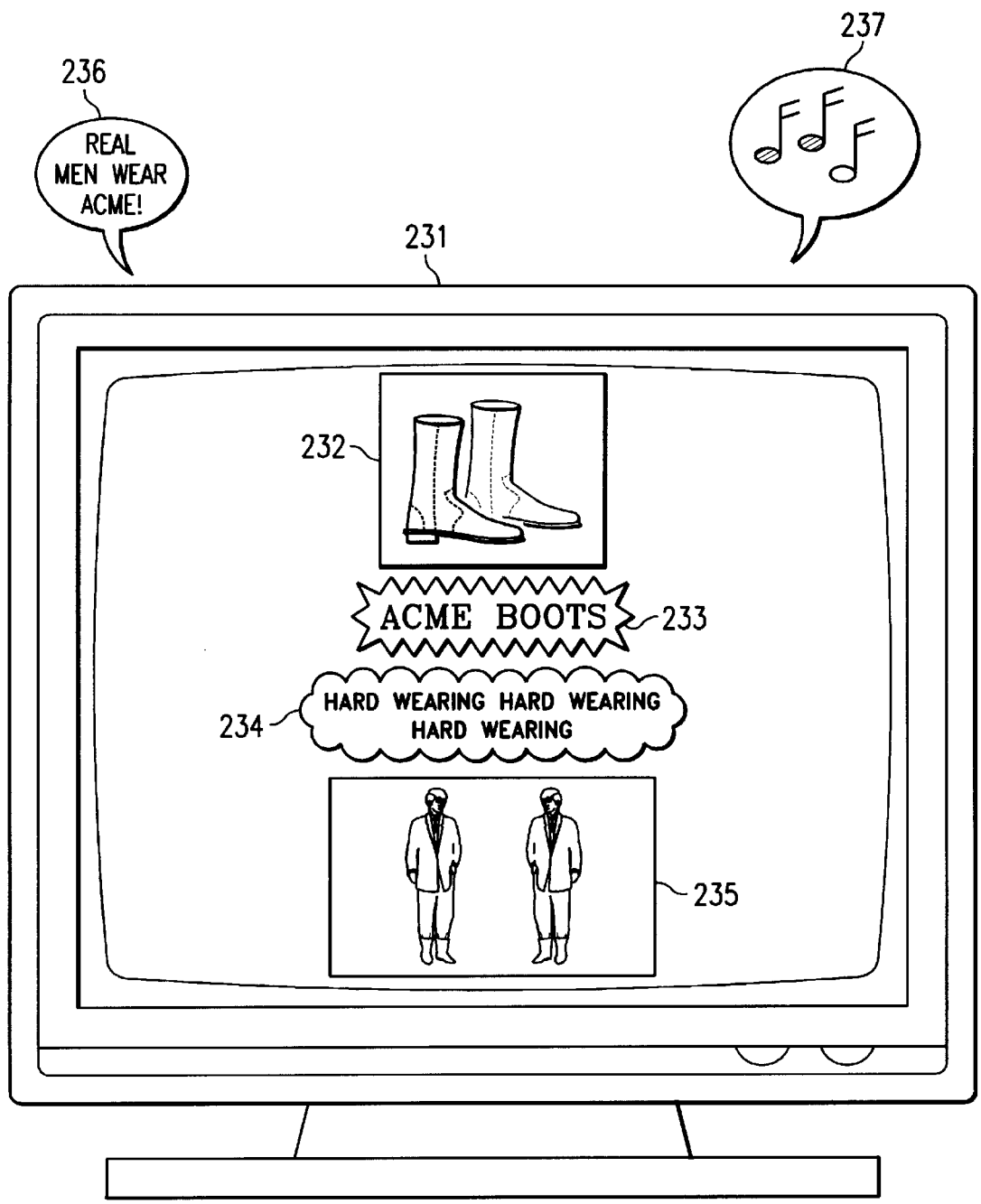
FIG. 2B illustrates runtime view 231 corresponding to the exemplary playback score 201 illustrated in FIG. 2A.
Figure 2C:
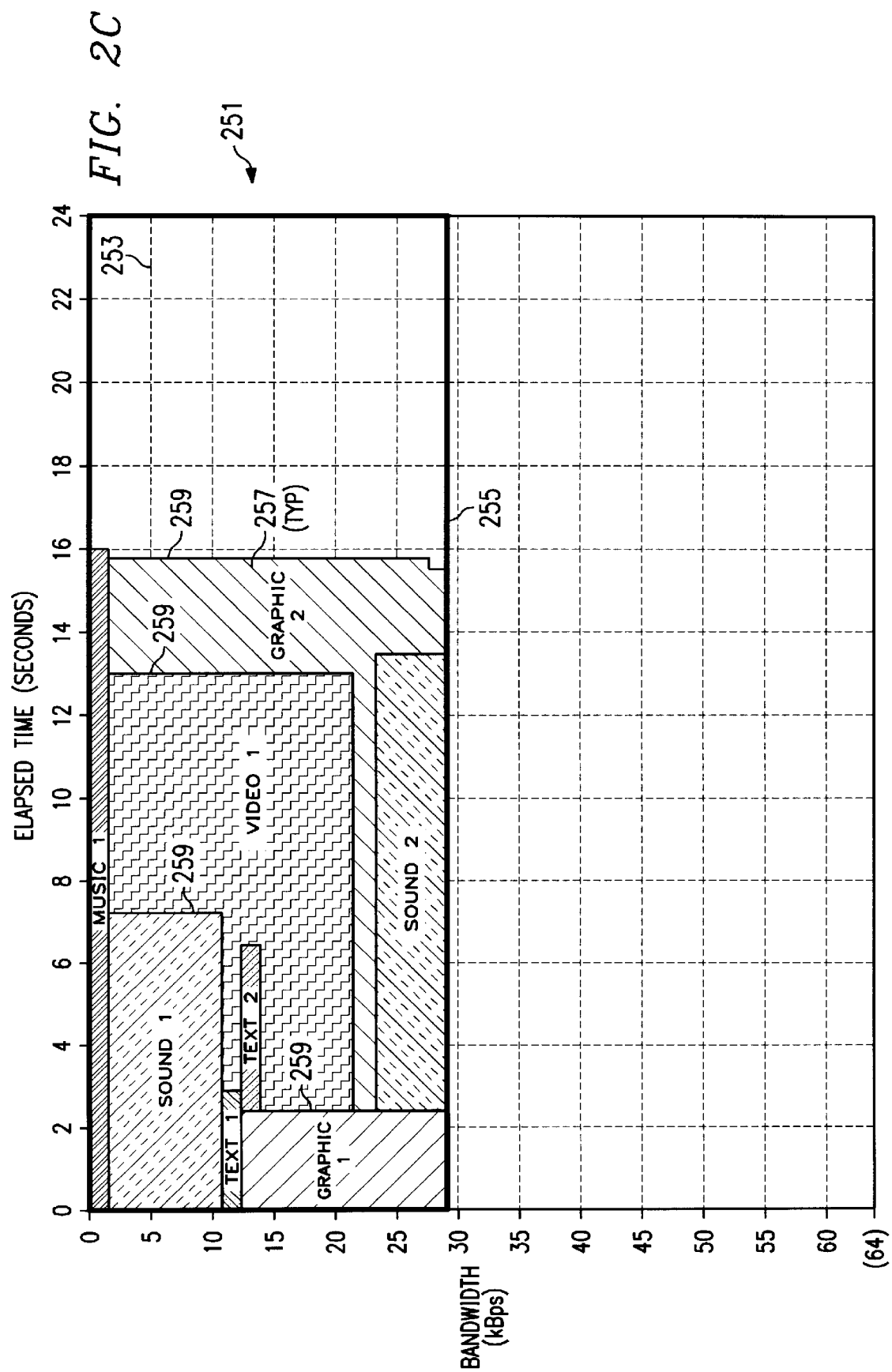
FIG. 2C illustrates download score 251 corresponding to the exemplary playback score illustrated in FIG. 2A.

With reference now to FIGS. 2A, 2B and 2C, and with continuing reference to the components illustrated on FIG. 1, the main elements comprising the tool of the present invention are shown. FIG. 2A illustrates playback score 201 in a style similar to graphical media object orchestration and playback displays known in the art. Scaled playback grid 203 shows time indexed on the x-axis and a plurality of playback icons 205 disposed down the y-axis. Each playback icon 205 represents a corresponding media object to be played within a time window indicated by the left and right extremities of the icon 205 as located on the x-axis of playback grid 203. The system designer may add, drop and move playback icons 205 around playback grid 203, effecting temporal changes in the "orchestral" playback sequence of the combined corresponding playback. Other aesthetic effects are also advantageously available, such as, for example, speed of playback of individual media objects, volume of playback of audible objects etc. As a result, a multimedia presentation may be orchestrated, including voice, text, graphics, photographs and music, according to a script represented by playback icons 205 deployed on playback grid 203.

FIG. 2B illustrates a runtime view 231 corresponding to playback score 201 on FIG. 2A. The system designer switches to runtime view 231 to see and hear the multimedia presentation orchestrated on playback score 201. In the examples used in FIGS. 2A and 2B, playback icons 205 on FIG. 2A correspond to audiovisuals on FIG. 2B as follows on Table 1:

TABLE 1

| Playback Icon on FIG. 2A | Audiovisual item on FIG. 2B |
| --- | --- |
| Graphic 2 | 232 |
| Graphic 1 | 233 |
| Text 1/Text 2 | 234 |
| Video 1 | 235 |
| Sound 1 | 236 |
| Music 1 | 237 |

Advantageously, the system designer can switch to runtime view 231 at any time to view all or part of the multimedia presentation orchestrated on playback score 201, responsive to start and stop markers set on playback score 201. The system designer may further advantageously vary the replay speed of runtime view 231 in order to give attention to specific aspects. It will be understood, however, that runtime view 231 is a "slave" replay to playback score 201, and any substantive changes to the content of the orchestrated Playback Script must be made on playback score 201. To this extent, runtime view 231 merely allows the designer to see the results of his or her work.

Turning now to FIG. 2C, the present invention provides a third "view" of the multimedia presentation being orchestrated on playback score 201 on FIG. 2A. In a preferred embodiment, playback score 201, runtime view 231 and download score 251 are further viewable by the system designer substantially concurrently. Any method known in the art to enable this is satisfactory, such as, for example, splitting a screen into tiles or "switching" between screens, or viewing separate windows.

FIG. 2C illustrates a download score 251 as created by the present invention. Download score 251 corresponds with playback score 201 such that changes to playback score 201 are automatically reflected in download score 251. Also analogous to playback score 201, download score 251 provides download grid 253 indexed on the x-axis to represent time. It is preferable, but not required, for the temporal scale on the x-axes of both playback and download grids 201 and 251 to be substantially the same in a default setting. Advantageously, however, the system designer may vary the x-axis scales of playback and download grids 201 and 251 independently.

In distinction to playback grid 203 as shown on FIG. 2A, however, download grid 253 on FIG. 2C also has a scaled y-axis. This y-axis represents bandwidth, and is advantageously indexed in increments of kilobits per second (kbps). Optimally, the system designer may vary the x-axis and y-axis scales as displayed on download grid 253 independently.

FIG. 2C shows download icons 257 deployed by the system on download grid 253. The system creates a download icon 257 for each playback icon 205 placed on playback score 201 by the system designer (as illustrated in FIG. 2A) in orchestrating a multimedia presentation. The systems first identifies and fixes the topographical area of each download icon 257 in view of the x- and y-scales selected for download grid 253. The system accomplishes this by analyzing each media object's data size, and then determining and assigning the topographical area corresponding to that data size on the currently selected x- and y-scales of grid 253.

With further reference to FIG. 2C, pipe 255 is disposed on download grid 253 as a pair of lines running parallel to the x-axis and separating an amount of bandwidth selected by the system designer. Advantageously, any amount of bandwidth is selectable to be contained in pipe 255. Pipe 255 thus represents a bandwidth constraint in the execution of the Playback Script.

With continuing reference to FIG. 2C, the system further automatically deploys download icons 257 within pipe 255. As previously noted, as download icon 257 is displayed for each media object represented by a playback icon 205 displayed on the playback score 201. Thus, when a system designer deploys a playback icon 205 on playback grid 203 as part of orchestrating a script, the present invention deploys a corresponding download icon 257 on download grid 253 within pipe 255.

As the system designer adds, drops and manipulates playback icons 205 on playback grid 203 to orchestrate a Playback Script, the present invention arranges the display of download icons 257 within pipe 255 according to predetermined delivery rules. These rules include:

(a) download icons 257 must stay topographically within the confines of pipe 255 (i.e. must not "overhang");

(b) download icons 257 must not "overlap" topographically within pipe 255;

(c) delivery of data must keep up with demand (i.e. the portion of a download icon 257's topographical area displayed prior to any moment in time on the x-axis of download grid 253 must represent at least the amount of data within the corresponding media object needed by the Playback Script at that same moment in time); and (d) as far as is topographically possible, all vacant space in pipe 255 must be occupied by justifying and packing download icons 257 within pipe 255 starting from timebase zero (i.e. from the left as shown on FIG. 2C).

In this way, as the system designer manipulates playback icons 203 on playback grid 203, the present invention topographically "fills up" pipe 255 by packing and left-justifying it with download icons 257. It will be appreciated that the present invention thereby creates a Download Script that is a companion to the Playback Script, in which available bandwidth is optimized while satisfying the information needs of the Playback Script.

Advantageously, the system initially deploys download icons 257 within pipe 255 as rectangular shapes. As the system designer adds information to the Playback Script with more complexity, however, the present invention adapts the rectangular shapes as required into other shapes to fit download icons 257 together within pipe 255 according to the delivery rules.

With further reference to FIG. 2C, a preferred embodiment of the present invention is further disposed to adapt the displays of download icons 257 into any rectangular or square-sided polygonal shape to enable optimal "filling up" of pipe 255 according to the delivery rules. In this way, the present invention advantageously adapts download icons 257 of correctly scaled topographical areas into just about any square-sided polygonal arrangement to meet the delivery rules. Although not illustrated, it will be further understood that the present invention is not limited, however, to displaying download icons 257 in square-sided polygonal shapes. Consistent with the present invention, any shaped download icon 257 (including shapes with trapezoidal features or curved lines) may be created to enclose a correctly scaled topographical area to be deployed in pipe 255 in combination with other download icons 257.

The present invention's deployment of static download icons 257 (such as graphic icon 258 on FIG. 2C) on download score 251 deserves special mention. It will be understood that in typical multimedia presentations, "dynamic media objects" (such as audio or video) have a dynamic real time play length, whereas "static media objects" (such as graphics) are displayed statically for a preselected time. It will, therefore, be appreciated that static media objects such as graphics are advantageously deployed in a multimedia presentation as quickly as possible, so that the image appears rapidly.

In a preferred embodiment, an initial default deployment rule is followed wherein the system initially deploys static download icons on download score 251 to download fully within 50% of their corresponding playback time on playback score 201 on FIG. 2A. This is reflected in the start and stop times in the deployment of graphic icon 258 on download grid 253 on FIG. 2C. Note that 50% is an exemplary value, and ideally is a designer-selectable parameter for different types or sizes of static media objects.

Once the system has initially deployed such static download icons 257 on download score 251 according to the "50% rule," the system then attempts to maintain the 50% rule while increasing numbers of download icons 257 compete for space within pipe 255.

The system's inability to maintain the 50% rule for static download icons 257 does not, however, in a preferred embodiment, create an error condition in and of itself. Instead, with reference now to FIG. 2A, it will be seen that static playback icons 205 also each have a marker 207 along the time-based x-axis. Markers 207 indicate a "minimum clarity point" in the delivery of corresponding download icons 257 on download score 251 (see FIG. 2C). Markers 207 are automatically generated by the system. The "minimum clarity point" is a designer-selectable percentage of data in the media object which, when displayed on runtime view 231 on FIG. 2B, will make the media object appear acceptably intelligible to the viewer. The "minimum clarity point" may, of course, be up to 100%, if the system designer determines that a "partial" display of the corresponding media object, such as a blurry image, is undesirable. Markers 207 on playback icons 205 on FIG. 2A indicate, during the playback period of static media objects, when the "minimum clarity point" will be reached according to the current Download Script. If the designer sees on playback score 201 that a marker 207 is unacceptably late in the display of a particular static media object, he or she may wish to adapt the Playback Script to enable delivery of the static media objects faster, causing marker 207 to be displayed earlier in time on playback score 201.

Although, as described above, in a preferred embodiment the present invention automatically updates the arrangement of download icons 257 on download score 251 responsive to changes by the system designer in playback score 201, this does not mean that the system designer may not take advantage of information displayed on download score 251 when making choices in orchestrating playback score 201. For instance, the system designer may see that at a particular point in the download schedule, the arrival of media objects is so far ahead of the playback schedule that it would be advantageous to introduce additional objects into the playback schedule to make playback more information-rich. Alternatively, the system designer may encounter heavy demand for media objects at a particular point in the download schedule, where such demand may be eased by "preloading" a media object earlier in the schedule, at a time when there is less demand. Such "preloading" may even be accomplished in a previous playback schedule when the system designer knows that the preloaded media object is going to be required in a later playback schedule.

As the system designer continues to make the Playback Script more data-rich, the invention continues to fill up bandwidth on download score 251. Eventually, however, if the designer continues to make the Playback Script increasingly data-rich, an error condition will occur where the system is unable to fit all download icons 257 inside pipe 255 on the download score without breaking a delivery rule. Such a condition usually occurs in the presence of a "starving" error (where delivery in one or media objects on the Download Script cannot keep up with demand for that data on the Playback Script). The error condition may also occur in a situation where the system designer takes a Playback Script deliverable within a first bandwidth and then reduces the size of pipe 255 to a second, lower bandwidth.

Whenever a system designer creates an error condition in which a delivery rule is broken, the present invention alerts the designer of this condition. Advantageously, the alert includes a visible alert of the error condition on both playback and download scores 201 and 251, as well as an optional audible alert (e.g. "bong"). The system designer preferably has the capability to disable the audible alert if so desired. The visible alert is preferably by highlighting icons 205 and 257 causing the error condition via, for example, shading or alternate coloring of the icons in error. Different visible or audible alerts may correspond to different error conditions.

Figure 2D:
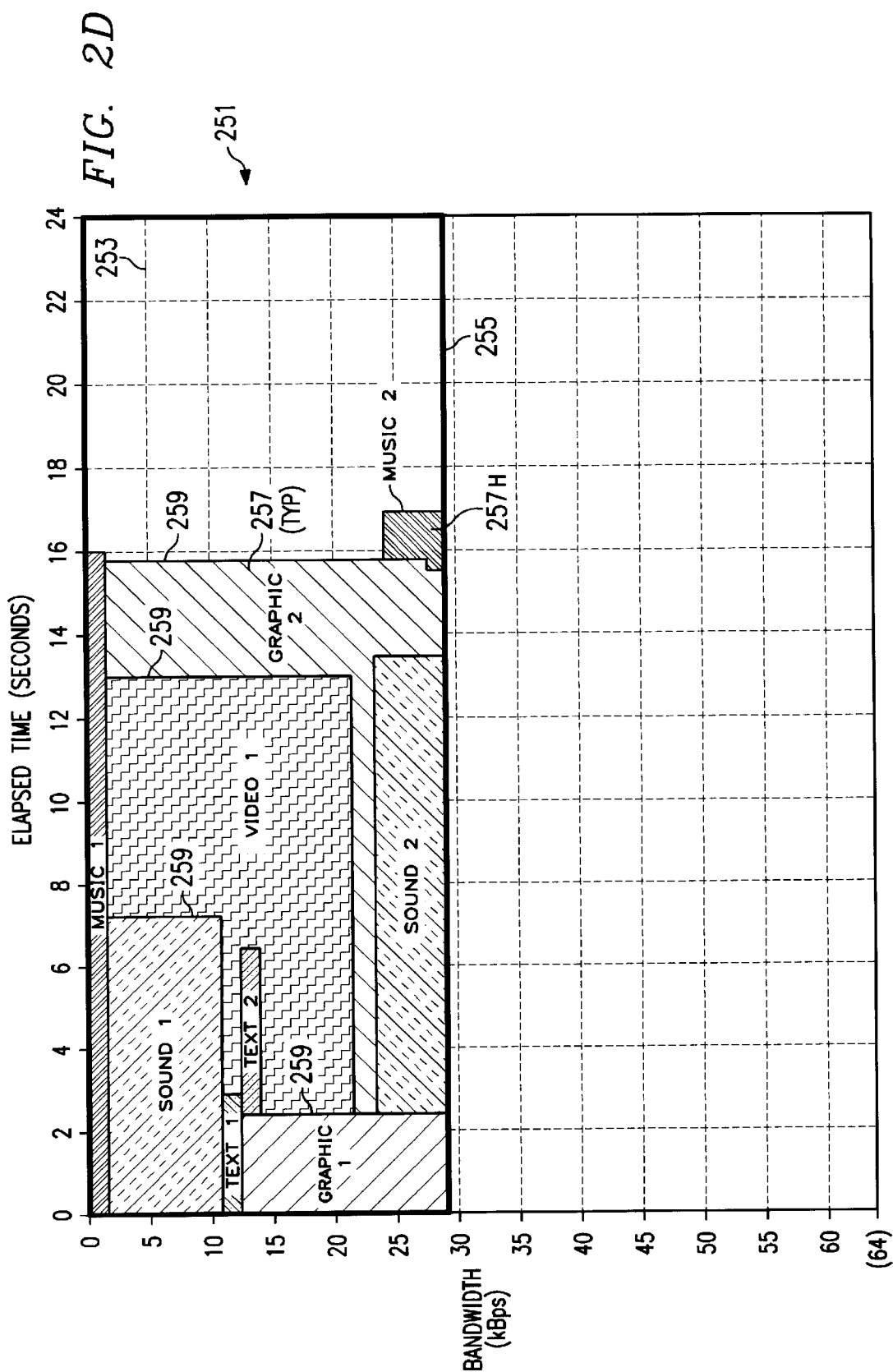
FIG. 2D illustrates exemplary download score 251 in which download icon 257H is highlighted to indicate that delivery thereof as currently ordained on download score 251 cannot keep up with demand on the corresponding playback score 201.

FIG. 2D depicts download score 251 with download icon 257H highlighted as in error. In the example of FIG. 2D, the media object represented by icon 257H ("Music 2") is unable to be delivered in time for demand for it on the Playback Script.

In response to an error condition to which he/she is alerted, the system designer must then either relax the bandwidth constraint by making pipe 255 wider, or take one or more corrective actions on playback score 201. Such corrective actions may include a combination of the following:

(a) altering the Playback Script to reduce demand for data at critical periods (e.g. play data-rich media objects slower and/or later);

(b) changing the content characteristics of one or more media objects, such as substituting in a less data-rich media object (e.g. text for a graphic, midi music for "wav" music), or degrading the data-richness of the media object (e.g., reducing the sampling rate in a "wav" sound file); or (f) delaying the start of the whole script by a small time period to allow more time for media objects to "preload".

Depending on the corrective actions taken by the system designer on playback score 201, the system makes corresponding adjustments to download icons 257 as currently deployed on the download score. Deleting a playback icon 205 from playback score 201 causes the system to remove the corresponding download icon 257 from download score 251. Adding a playback icon 205 causes the system to deploy a new corresponding download icon 257 on download score 251. The system then automatically arranges the new icon 257 with other download icon 257 within pipe 255 so that the Download Script, now including the new icon 257, continues to comply with the delivery rules. Moving the start time or end time of a playback icon 205 on playback score 251 causes the system to adjust the arrangement of the corresponding download icon 257 within pipe 255, if necessary, to ensure continued compliance with the delivery rules. Altering the content of a media object causes the system to first recalculate and reassign the topographical area now representing the new data size of the media object. The system then adjusts the topographical area of the corresponding download icon 257 on download score 251 by cutting or adding area at the "end-of-delivery boundary". It will be appreciated that as used in this disclosure, "end-of-delivery" boundary means the boundary of a download icon 257 running perpendicular to the x-axis on grid 253, and that defines a time on the x-axis when the delivery of the media object represented by that icon is complete. Exemplary end-of-delivery boundaries 259 are illustrated on FIG. 2C.

Alternatively, in a second preferred embodiment, the system takes automatic corrective action when a delivery rule is broken. In this embodiment, the system automatically degrades the content of selected media objects by a preselected amount whenever the Download Script cannot keep up with the Playback Script. The action of degrading reduces the data size of the media object, and therefore its corresponding topographical area as deployed on download score 251 within pipe 255. Sufficient selective degradation (with corresponding topographical area reduction) should eventually allow all download icons 257 to be arranged within pipe 255 on download score 251.

It will be understood that degrading the media object is typically accomplished by compression or resampling techniques. The invention is not limited, however, to compression or resampling as the only methods of degrading a media object.

In this second embodiment in which the system automatically degrades media objects to reduce their data size, the system may also offer various options to the system designer in customizing the conditions under which such automatic degradation is to occur. Such options include:

(a) Only a highlighted object is degraded, or all objects are degraded, or selected objects are degraded;

(b) Degradation of objects is in preselected increments on an individual basis, or on a group basis; and (c) Degradation is in a preselected sequence of objects.

It will be appreciated that methods known in the art can be used to accumulate the designer's choices in creating the conditions governing the selective degradation of media objects. Such methods include building tables whose parameters are referred to during the automatic degradation process.

The application of the present invention to the design of UDTs, as disclosed in the UDT Invention, will now be appreciated. Separate UDTs may be designed where Playback Script 201 enables the information exchange of the corresponding TT according to different delivery bandwidth ranges. For example, where delivery bandwidth is measured in the range, say, above 24 kbps, a UDT may be associated with the TT having a Playback Script whose information richness requires delivery bandwidth of 24 kbps or less. Where the delivery bandwidth is measured below 24 kbps, but above, say 8 kbps, a second UDT may be associated with the TT where the information richness of the playback requires delivery bandwidth of at least 8 kbps. It will be understood that, at the discretion of the system designer, there may also come a point in the bandwidth spectrum where the measured bandwidth is so low that the media objects are not worth delivering.

The foregoing selection of 24 kbps and 8 kbps as "cutoff" bandwidths are exemplary only. Ideally, an advantageous "cutoff" might occur when bandwidth becomes sufficiently low for a media object in a Playback Script to be required to be dropped rather than rescheduled or substituted. Other conditions, however, may also serve as thresholds to form "cutoff" bandwidths where a different UDT might be associated with a TT.

It will be understood that once the system designer is satisfied with a particular combination of playback and associated download schedules, the present invention then memorializes the download schedule as, for example, a job execution file. This execution file may be used subsequently to control the delivery of media objects according to the download schedule.

Although the present invention and its advantages have been described in detail, it should be understood that various changes, substitutions and alterations can be made herein without departing from the spirit and scope of the invention as defined by the appended claims.

I claim:

1. A method for allocating bandwidth in a multimedia scripting tool, the method comprising the steps of:

(a) writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;

(b) responsive to step (a), robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script;

(c) introducing a constraint of bandwidth in which the download script must deliver media objects to feed playback thereof in the playback script; and (d) robotically arranging the download icons on the download score so that the delivery script delivers media objects within the constraint of bandwidth to keep up with demand therefor in the playback script.

2. The method of claim 1, further comprising the steps of:
(e) changing the playback script; and
(f) responsive to step (e), robotically rearranging the download icons on the download score according to step (d) so that the delivery script continues to deliver media objects within the constraint of bandwidth to keep up with demand therefor in said changed playback script.

3. The method of claim 1, in which the download score presents a first axis scaled in increments of elapsed time orthogonal to a second axis scaled in increments of bandwidth, and in which download icons are deployed on the download score in step (b) according to initial default settings, the download icons further deployed as predetermined shapes whose topographical areas, in view of said scales of the first and second axes, are automatically sized to represent the data size of the corresponding media objects.

4. The method of claim 3, in which the predetermined shapes are rectangles as one of said initial default settings.

5. The method of claim 3, in which the constraint of bandwidth is a pipe formed by a space bounded between the first axis and a line drawn parallel thereto, the line further orthogonal to a point on the second axis representing the constraint of bandwidth.

6. The method of claim 5, in which said robotic arrangement in step (d) includes adapting the download icons according to delivery rules into adapted shapes situated within the pipe, the topographical areas enclosed by said adapted shapes held constant throughout said adaptation.

7. The method of claim 6, in which the adapted shapes include square-cornered polygons.

8. The method of claim 6, in which the adapted shapes include shapes with trapezoidal features.

9. The method of claim 6, in which the adapted shapes include shapes with curved lines.

10. The method of claim 6, in which the delivery rules include prohibiting the adapted shapes from overlapping within the pipe and prohibiting the adapted shapes from overhanging outside the pipe.

11. The method of claim 6, in which the delivery rules include justifying and packing the deployment of download icons within the pipe to occupy all space therein extant from timebase zero.

12. The method of claim 6, further comprising the step of:
(e) alerting of an error condition when a delivery rule is broken.

13. The method of claim 12, in which step (e) is accomplished audibly.

14. The method of claim 13, in which said audible alert may be selectively disabled.

15. The method of claim 12, in which the error condition is that at least one download icon, as deployed on the download score, is calling for the delivery of data in the corresponding media object in the delivery script later than when said data is needed in the playback script.

16. The method of claim 15, in which step (e) is accomplished by visibly highlighting said at least one download icon.

17. The method of claim 16, in which step (e) is further accomplished by highlighting the playback icons corresponding to said at least one download icon.

18. The method of claim 12, further comprising the step of:
(f) correcting for said error condition.

19. The method of claim 18, in which said error correction is accomplished by a combination of techniques, at least one of said techniques selected from the group consisting of:

(1) altering the playback script to play first selected media objects slower;
(2) altering the playback script to play second selected media objects later; and
(3) altering the data size of third selected media objects.

20. The method of claim 19, in which altering the data size of the third selected media objects causes corresponding end-of-delivery boundary adjustment on the delivery score.

21. The method of claim 3, in which the default settings further include deploying download icons representing static media objects so that the delivery script completes delivery of each static media object not later than a predetermined percentage, up to 100%, of the preselected period of time in which the corresponding playback icon is deployed on the playback score in step (a).

22. The method of claim 21, in which the predetermined percentage is 50%.

23. The method of claim 21, in which playback icons representing static media objects also each indicate a minimum clarity point on the playback score at which a predetermined percentage, up to 100%, of the corresponding media object has been delivered according the current delivery script.

24. The method of claim 1, further comprising the step of:
(e) playing back the media objects according to the playback script.

25. The method of claim 24, in which step (e) is executed in a separate runtime view.

26. The method of claim 25, in which the runtime view, the playback score and the delivery score are separately and independently viewable.

27. The method of claim 1, in which the playback score and the delivery score are separately and independently viewable.

28. The method of claim 1, further comprising the step of:
(e) robotically compensating when, in step (d) or step (f), the delivery script is unable to deliver media objects to keep up with demand therefor in the playback script.

29. The method of claim 28, in which step (e) includes the substep of robotically reducing the data size of selected media objects.

30. The method of claim 29, in which said robotic reduction in data size is accomplished by a technique selected from the group consisting of:
(1) resampling; and
(2) compression.

31. A method for allocating bandwidth in a multimedia scripting tool, the method comprising the steps of:
(a) writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;
(b) responsive to step (a), robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script, the download score presenting a first axis scaled in increments of elapsed time orthogonal to a second axis scaled in increments of bandwidth, download icons being deployed on the download score according to initial default settings, the download icons further deployed as predetermined shapes whose topographical areas, in view of said scales of the first and second axes, are automatically sized to represent the data size of the corresponding media objects;

(c) introducing a constraint of bandwidth in which the download script must deliver media objects to feed playback thereof in the playback script, the constraint of bandwidth represented as a pipe formed by a space bounded between the first axis and a line drawn parallel thereto, the line further orthogonal to a point on the second axis representing the constraint of bandwidth;

(d) robotically arranging the download icons on the download score so that the delivery script delivers media objects within the constraint of bandwidth to keep up with demand therefor in the playback script, said robotic arrangement including adapting the download icons according to delivery rules into adapted shapes situated within the pipe, the topographical areas enclosed by said adapted shapes held constant throughout said adaptation;

(e) changing the playback script;

(f) responsive to step (e), robotically rearranging the download icons on the download score according to step (d) so that the delivery script continues to deliver media objects within the constraint of bandwidth to keep up with demand therefor in said changed playback script;

(g) playing back the media objects according to the playback script in a separate runtime view, wherein the runtime view, the playback score and the delivery score are separately and independently viewable; and (h) robotically compensating when, in step (d) or step (f), the delivery script is unable to deliver media objects to keep up with demand therefor in the playback script, said robotic compensation including robotically reducing the data size of selected media objects by a technique selected from the group consisting of:
(1) resampling; and
(2) compression.

32. The method of claim 31, in which the predetermined shapes in step (b) are rectangles as one of said initial default settings.

33. The method of claim 31, in which the adapted shapes in step (d) are selected from the group consisting of:
(1) square-cornered polygons;
(2) shapes with trapezoidal features; and
(3) shapes with curved lines.

34. The method of claim 31, in which the delivery rules in step (d) include at least one delivery rule selected from the group consisting of:
(1) prohibiting the adapted shapes from overlapping within the pipe;
(2) prohibiting the adapted shapes from overhanging outside the pipe; and
(3) justifying and packing the deployment of download icons within the pipe to occupy all space therein extant from timebase zero.

35. The method of claim 31, in which the default settings in step (b) further include deploying download icons representing static media objects so that the delivery script completes delivery of each static media object not later than a predetermined percentage, up to 100%, of the preselected period of time in which the corresponding playback icon is deployed on the playback score in step (a).

36. The method of claim 35, in which the predetermined percentage is 50%.

37. The method of claim 35, in which playback icons representing static media objects also each indicate a minimum clarity point on the playback score at which a predetermined percentage, up to 100%, of the corresponding media object has been delivered according the current delivery script.

38. A system for allocating bandwidth in a multimedia scripting tool, the system comprising:

means for writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;

means, responsive to the means for writing, for robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script;

means for introducing a constraint of bandwidth in which the download script must deliver media objects to feed playback thereof in the playback script;

means for robotically arranging the download icons on the download score so that the delivery script delivers media objects within the constraint of bandwidth to keep up with demand therefor in the playback script;

means for alerting of an error condition wherein at least one download icon, as deployed on the download score, is calling for the delivery of data in the corresponding media object in the delivery script later than when said data is needed in the playback script; and means for correcting for said error condition by a combination of techniques, at least one of said techniques selected from the group consisting of:
(1) altering the playback script to play first selected media objects slower;
(2) altering the playback script to play second selected media objects later; and
(3) altering the data size of third selected media objects.

39. The system of claim 38, further comprising:
means for changing the playback script; and
means, responsive to the means for changing, for robotically rearranging the download icons on the download score so that the delivery script continues to deliver media objects within the constraint of bandwidth to keep up with demand therefor in said changed playback script.

40. The system of claim 38, further comprising:
means for playing back the media objects according to the playback script in a separate runtime view, wherein the runtime view, the playback score and the delivery score are separately and independently viewable.

41. The system of claim 38, in which the download score presents a first axis scaled in increments of elapsed time orthogonal to a second axis scaled in increments of bandwidth, and in which the means for robotically deploying is operable to deploy download icons on the download score according to initial default settings, and as predetermined shapes including rectangles whose topographical areas, in view of said scales of the first and second axes, are automatically sized to represent the data size of the corresponding media objects.

42. The system of claim 41, in which the default settings further include deploying download icons representing static media objects so that the delivery script completes delivery of each static media object not later than a predetermined percentage, up to 100%, of the preselected period of time in which the means for writing deploys the corresponding playback on the playback score.

43. The system of claim 42, in which the predetermined percentage is 50%.

44. The system of claim 42, in which playback icons representing static media objects also each indicate a minimum clarity point on the playback score at which a predetermined percentage, up to 100%, of the corresponding media object has been delivered according the current delivery script.

45. The system of claim 41, in which the constraint of bandwidth is a pipe formed by a space bounded between the first axis and a line drawn parallel thereto, the line further orthogonal to a point on the second axis representing the constraint of bandwidth.

46. The system of claim 45, in which the means for robotic arrangement includes means for adapting the download icons according to delivery rules into adapted shapes situated within the pipe, the topographical areas enclosed by said adapted shapes held constant throughout said adaptation.

47. The system of claim 46, in which the adapted shapes are selected from the group consisting of:
(1) square-cornered polygons;
(2) shapes with trapezoidal features; and
(3) shapes with curved lines.

48. The system of claim 46, in which the delivery rules include at least one delivery rule selected from the group consisting of:
(1) prohibiting the adapted shapes from overlapping within the pipe;
(2) prohibiting the adapted shapes from overhanging outside the pipe; and
(3) justifying and packing the deployment of download icons within the pipe to occupy all space therein extant from timebase zero.

49. A computer program product including computer readable logic recorded thereon for allocating bandwidth in a multimedia scripting tool, the computer program product comprising:
a computer-readable storage medium; and
a computer program stored on the computer-readable storage medium, the computer program comprising:
means for writing a playback script calling for the playback of a plurality of media objects each having a known data size, the playback script comprising a plurality of playback icons deployed on a playback score, each playback icon representing a corresponding media object, each playback icon deployed on the playback score according to a preselected period in real time in which the playback script calls for the corresponding media object to be played back;
means, responsive to the means for writing, for robotically deploying download icons on a download score to create a download script corresponding to the playback script, one download icon deployed for each media object represented by a playback icon deployed on the playback score, deployment of a download icon on the download score representing delivery of the corresponding media object in real time to feed playback thereof in the playback script;
means for introducing a constraint of bandwidth in which the download script must deliver media objects to feed playback thereof in the playback script;
means for robotically arranging the download icons on the download score so that the delivery script delivers media objects within the constraint of bandwidth to keep up with demand therefor in the playback script; and
means for robotically compensating when the delivery script is unable to deliver media objects to keep up with demand therefor in the playback script.

50. The computer program product of claim 49, in which the means for robotically compensating includes means for robotically reducing the data size of selected media objects.

51. The computer program product of claim 50, in which said means for reducing is operable using a technique selected from the group consisting of:
(1) resampling; and
(2) compression.

52. The computer program product of claim 49, further comprising means for playing back the media objects according to the playback script in a separate runtime view, wherein the runtime view, the playback score and the delivery score are separately and independently viewable.

53. The computer program product of claim 49, in which the download score presents a first axis scaled in increments of elapsed time orthogonal to a second axis scaled in increments of bandwidth, and in which the means for robotically deploying is operable to deploy download icons on the download score according to initial default settings, and as predetermined shapes including rectangles whose topographical areas, in view of said scales of the first and second axes, are automatically sized to represent the data size of the corresponding media objects.

54. The computer program product of claim 53, in which the default settings further include deploying download icons representing static media objects so that the delivery script completes delivery of each static media object not later than a predetermined percentage, up to 100%, of the preselected period of time in which the means for writing deploys the corresponding playback on the playback score.

55. The computer program product of claim 54, in which the predetermined percentage is 50%.

56. The computer program product of claim 54, in which playback icons representing static media objects also each indicate a minimum clarity point on the playback score at which a predetermined percentage, up to 100%, of the corresponding media object has been delivered according the current delivery script.

57. The computer program product of claim 53, in which the constraint of bandwidth is a pipe formed by a space bounded between the first axis and a line drawn parallel thereto, the line further orthogonal to a point on the second axis representing the constraint of bandwidth.

58. The computer program product of claim 57, in which the means for robotic arrangement includes means for adapting the download icons according to delivery rules into adapted shapes situated within the pipe, the topographical areas enclosed by said adapted shapes held constant throughout said adaptation.

59. The computer program product of claim 58, in which the adapted shapes are selected from the group consisting of:

(1) square-cornered polygons;

(2) shapes with trapezoidal features; and (3) shapes with curved lines.

60. The computer program product of claim 58, in which the delivery rules include at least one delivery rule selected from the group consisting of:

(1) prohibiting the adapted shapes from overlapping within the pipe;

(2) prohibiting the adapted shapes from overhanging outside the pipe; and (3) justifying and packing the deployment of download icons within the pipe to occupy all space therein extant from timebase zero.

* * * * *